United States Patent
Tanaka et al.

(10) Patent No.: US 8,456,677 B2
(45) Date of Patent: Jun. 4, 2013

(54) IMAGE INFORMATION TRANSMISSION DEVICE, IMAGE INFORMATION TRANSMISSION METHOD AND COMPUTER READABLE MEDIUM

(75) Inventors: Isao Tanaka, Saitama (JP); Minoru Yoshida, Saitama (JP); Toshitaka Nakagawa, Saitama (JP); Satoshi Watanabe, Saitama (JP); Nobuyuki Kudo, Saitama (JP); Hitoshi Tamura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 457 days.

(21) Appl. No.: 12/787,733

(22) Filed: May 26, 2010

(65) Prior Publication Data

US 2011/0102831 A1    May 5, 2011

(30) Foreign Application Priority Data

Nov. 4, 2009    (JP) .................................. 2009-252987

(51) Int. Cl.
*G06F 3/12* (2006.01)
(52) U.S. Cl.
USPC ....................................................... 358/1.15

(58) Field of Classification Search
None
See application file for complete search history.

(56) References Cited

U.S. PATENT DOCUMENTS

2007/0280122 A1 * 12/2007 Ito .................................. 370/250

FOREIGN PATENT DOCUMENTS

JP    A-2001-306274    11/2001

* cited by examiner

*Primary Examiner* — Marivelisse Santiago Cordero
*Assistant Examiner* — Mesfin Getaneh
(74) *Attorney, Agent, or Firm* — Oliff & Berridge, PLC

(57) ABSTRACT

An image information transmission device includes a registration unit, a storage unit, a determination unit, and an image information transmission unit. The registration unit registers an image information transmission instruction describing a destination number specifying a destination of image information and an abbreviated number corresponding to the destination number. The storage unit stores the destination number and transmission setting information used for transmitting the image information to the destination specified by the destination number. The determination unit determines whether or not the destination number described in the image information transmission instruction is contained in the destination number. The image information transmission unit transmits the image information.

8 Claims, 6 Drawing Sheets

| JOB TYPE | SET INFORMATION | SET VALUE |
|---|---|---|
| IMAGE READ | SIZE | AUTO |
| | SINGLE/DOUBLE FACE | SINGLE FACE |
| | COLOR MODE | MONOCHROME |
| | RESOLUTION | 200dpi |
| | MAGNIFICATION | 100% |
| FACSIMILE TRANSMISSION | ABBREVIATED NUMBER | 0001 |
| | DESTINATION NUMBER | 03-1234-5678 |

FIG. 5

| ABBREVIATED NUMBER 501 | JOB TYPE 502 | DESTINATION NUMBER 503 | COMMUNICATION MODE 504 | ... | MODEM SPEED 505 | TRANSMISSION LEVEL 506 | INCOMING LEVEL 507 | NUMBER OF REDIAL TIMES 508 |
|---|---|---|---|---|---|---|---|---|
| 0001 | FACSIMILE TRANSMISSION | 03-1234-5678 | G3 AUTOMATIC | ... | 14400bps | 0dBm | 25dBm | 5 |
| 0002 | FACSIMILE TRANSMISSION | 03-1234-5600 | G3 AUTOMATIC | ... | 14400bps | -7dBm | 1dBm | 2 |
| ... | ... | ... | ... | ... | ... | ... | ... | ... |
| 2000 | FACSIMILE TRANSMISSION | 03-1234-4321 | G3 AUTOMATIC | ... | 28800bps | -7dBm | 1dBm | 3 |

FIG. 6

| ABBREVIATED NUMBER | JOB TYPE | DESTINATION NUMBER | COMMUNICATION MODE | ... | MODEM SPEED | TRANSMISSION LEVEL | INCOMING LEVEL | NUMBER OF REDIAL TIMES |
|---|---|---|---|---|---|---|---|---|
| 0001 | FACSIMILE TRANSMISSION | 06-6789-3210 | G3 AUTOMATIC | ... | 14400bps | 0dBm | 25dBm | 5 |
| 0002 | FACSIMILE TRANSMISSION | 03-1234-5600 | G3 AUTOMATIC | ... | 14400bps | -7dBm | 1dBm | 2 |
| ... | ... | ... | ... | ... | ... | ... | ... | ... |
| 2000 | FACSIMILE TRANSMISSION | 03-1234-4321 | G3 AUTOMATIC | ... | 28800bps | -7dBm | 1dBm | 3 |

↑501 ↑502 ↑503 ↑504 ↑505 ↑506 ↑507 ↑508

IMAGE INFORMATION TRANSMISSION DEVICE, IMAGE INFORMATION TRANSMISSION METHOD AND COMPUTER READABLE MEDIUM

CROSS-REFERENCE TO RELATED APPLICATIONS

This application is based upon and claims priority under 35 USC 119 from Japanese Patent Application No. 2009-252987, filed Nov. 4, 2009.

BACKGROUND

1. Technical Field

This invention relates to an image information transmission device, image information method and a computer readable medium.

2. Related Art

To transmit facsimile data stored in a storage area to a destination by facsimile, an art of automatically transmit the data based on the descriptions of an instruction is on public view.

SUMMARY OF THE INVENTION

According to an aspect of the invention, an image information transmission device includes a registration unit, a storage unit, a determination unit, and an image information transmission unit. The registration unit registers an image information transmission instruction describing a destination number specifying a destination of image information and an abbreviated number corresponding to the destination number. The storage unit stores the destination number and transmission setting information used for transmitting the image information to the destination specified by the destination number so that the destination number and the transmission setting information is associated with the abbreviated number. The determination unit determines whether or not the destination number described in the image information transmission instruction is contained in the destination number stored in association with the abbreviated number in the storage unit when the image information is transmitted based on the image information transmission instruction registered through the registration unit. The image information transmission unit transmits the image information by using the transmission setting information with respect to the abbreviated number stored in the storage unit to the destination specified by the destination number described in the image information transmission instruction when the determination unit determines that the destination number is contained in the destination number stored in the storage unit.

BRIEF DESCRIPTION OF THE DRAWINGS

Exemplary embodiments of the invention will be described in detail based on the following figures, wherein:

FIG. 5 is a drawing to show an example of transmission set information; and

FIG. 6 is a drawing to show an example of transmission set information.

DETAILED DESCRIPTION

Figure 1:
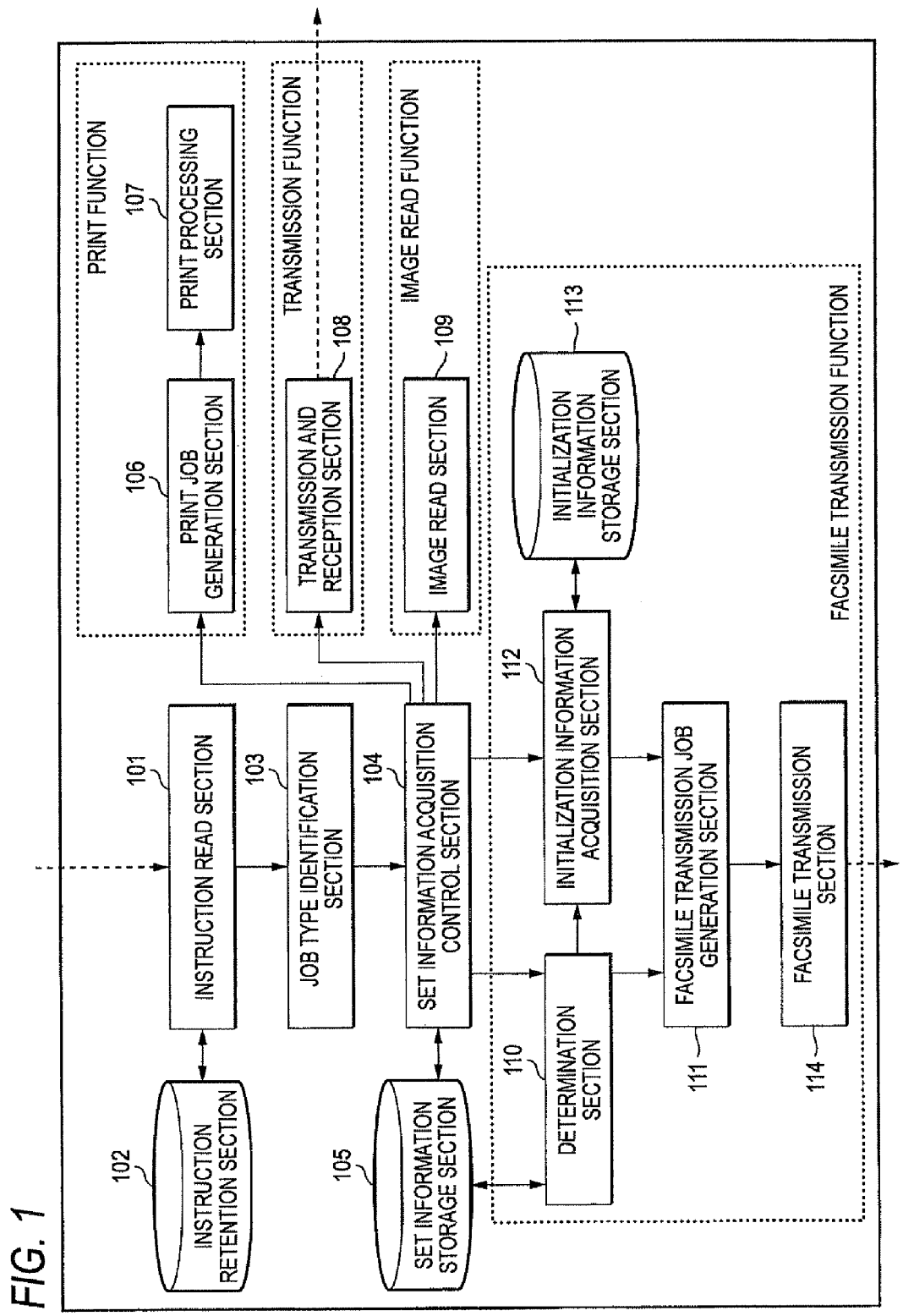
FIG. 1 is an example of a block diagram of an image forming apparatus incorporating the mage information transmission device and the image information transmission program in the exemplary embodiment of the invention.

One exemplary embodiment of an image information transmission device and an image information transmission program according to the invention will be discussed below in detail with reference to the accompanying drawings:

FIG. 1 is an example of a block diagram of an image forming apparatus incorporating the mage information transmission device and the image information transmission program in the exemplary embodiment of the invention.

In FIG. 1, the image forming apparatus is made up of an instruction read section 101, an instruction retention section 102, a job type identification section 103, a set information acquisition control section 104, a set information storage section 105, a print job generation section 106, a print processing section 107, a transmission and reception section 108, an image read section 109, a determination section 110, a facsimile transmission job generation section 111, an initialization information acquisition section 112, an initialization information storage section 113, and a facsimile transmission section 114.

The print job generation section 106 and the print processing section 107 implement "print function," the transmission and reception section 108 implements "transmission and reception function," the image read section 109 implements "image read function," and the determination section 110, the facsimile transmission job generation section 111, the initialization information acquisition section 112, the initialization information storage section 113, and the facsimile transmission section 114 implement "facsimile transmission function."

The instruction read section 101, the instruction retention section 102, the job type identification section 103, the set information acquisition control section 104, and the set information storage section 105 are common processing functions in each function.

Each instruction describing the processing procedure in each function (print function, transmission-reception function, image read function, facsimile transmission function) and set information when processing in each function is performed is registered and is retained in the instruction retention section 102.

Figure 4:
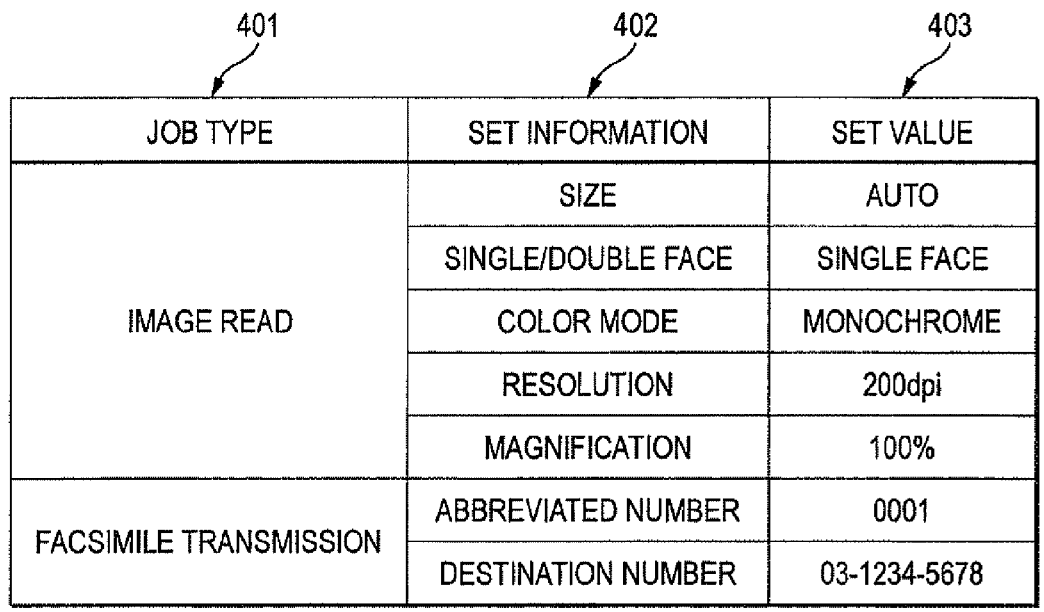
FIG. 4 is a drawing to show an example of an instruction.

The instruction retained by the instruction retention section 102 is, for example, in XML (eXtensible Markup Language) format and is also represented according to a table configuration as shown in FIG. 4.

First, for the instruction in the XML format, the function to be executed and processing set information used when the function is executed are specified by using XML tags. The set value in each set information is set according to attribute information stored according to XML tags.

An example of the instruction in the XML format is shown below: The numeric value indicated at the left end of each line of XLM represents the line number.

```
01      <?xml version="1.0" encoding="UTF-8"?>
02      <soapENV:Envelope
xmlns:soapENV="http://schemas.xmlsoap.org/soap/envelope
03          <soapENV:Header>
04          </soapENV:Header>
05          <soapENV:Body>
06              <Scan><!-- parameter of scan >
07                  <Size>Auto</Size><!-- document size >
08                  <Plex>Simplex</Plex><!-- single/double side read>
09                  <ColorMode>B/W</ColorMode><!-- color mode -->
10                  <Resolution>200</Resolution><!-- resolution -->
11                  <Magnification>100%</Magnification><!-- scaling
factor -->
12              </Scan>
13              <Fax><!-- fax transmission parameter -->
14                  <SpeedDial>0001</SpeedDial><!-- abbreviated
number -->
15                  <DialNumber>03-1234-5678</DialNumber<!-- call
number -->
16              <Fax>
17          </soapENV:Body>
18      </soapENV:Envelope>
```

The instruction in the XML format is indicated by XML tag "<Scan>" and tag "<Fax>" as the function to be executed.

The tag "<Scan>" specifies execution of the image read function and "<Fax>" specifies execution of the facsimile transmission function.

As set information in the image read function specified by the <scan> tag, read set information is defined according to each tag of <size>, <Plex>, <ColorMode>, <Resolution>, and <Magnification> stored in tag "<scan> </scan>" indicating the function and attribute information stored in the tags is set values for the read set information.

The set value stored according to the <size> tag is "Auto" and thus the processing set information indicates that the document size defined by the <size> tag is "auto"matically selected. The set value stored according to the <Plex> tag is "simplex" and thus the processing set information indicates that read of "single side" is selected in read setting of single side, double sides defined by the <simplex> tag.

Since the set value stored according to the <ColorMode> tag is "B/W," it is indicated that read of the color mode defined by the <ColorMode> tag as "monochrome" is selected. Since the set value stored according to the "Resolution" tag is "200," it is indicated that read of the resolution defined by the <Resolution> tag as "200 dpi" is selected. Since the set value stored according to the <Magnification> tag is "100%," it is indicated that read of the scaling factor defined by the <Magnification> tag as "100%" is selected.

For the facsimile transmission function, set information is defined by the tags of <SpeedDial> and <DialNumber>.

In the set information, the set value stored according to the <SpeedDial> tag is "0001" and thus transmission to the destination of the destination number specified by "0001" of the abbreviated number defined by the <SpeedDial> tag is indicated. Since the set value stored according to the <DisalNumber> tag is "03-1234-5678," facsimile transmission to the destination specified by "03-1234-5678" of the destination number defined by the <DisalNumber> tag is executed.

That is, the "abbreviated number" and the "destination number" are set in the processing set information using the function of facsimile transmission. At this time, the processing set information in the facsimile transmission function described in the instruction is called "transmission set information" and the instruction in which transmission set information is described is also particularly called "image information transmission instruction."

Next, FIG. 4 shows an example of an instruction of a table structure rather than the instruction in the XML format as described above.

The instruction shown in FIG. 4 is a table structure made up of "job type" item 401, "set information" item 402, and "set value" item 403. The "job type" item 401 is the job type specifying the function to be executed and FIG. 4 shows the types of "image read" and "facsimile transmission" as the job type.

The "set information" item 402 is set information used for processing of each function identified according to the job type indicated in the "job type" item 401. If the job type is "facsimile transmission," the "destination number" specifying the destination of facsimile and the "abbreviated number" specifying the destination number.

Further, the set values for the set information set in the "set information" item 402 are set in the "set value" item 403.

The user operates using a user interface or a preset given time is counted in a state in which the instruction of the table structure and the instruction in the XML format are retained in the instruction retention section 102, whereby the instruction read section 101 reads the instruction retained in the instruction retention section 102.

The instruction read section 101 sends the read instruction to the job type identification section 103.

If a plurality of instructions are retained in the instruction retention section 102, the instruction read section 101 reads the instruction if the instruction is specified; if no instruction is specified, the instruction read section 101 reads the instruction set to "effective" or the instruction with the most recent update date and time.

Of course, a plurality of instructions may be read. In this case, processing is performed based on each read instruction.

Upon reception of the instruction read by the instruction read section 101, the job type identification section 103 identifies the "job type" of processing command specified by the instruction. For example, for the instruction in the XML format, the job type is identified as "image read" and "facsimile transmission."

If the job type identification section 103 identifies the job type, the job type identification section 103 sends the instruction together with the identified job type to the set information acquisition control section 104.

The set information acquisition control section 104 receives the instruction together with the job type from the job type identification section 103.

If the received job type is "facsimile transmission," "transmission set information" stored in the set information storage section 105 is acquired.

In contrast, if the received job type is any other job type than facsimile transmission (print, transmission and reception, image read), the instruction is sent to the print job generation section 106, the transmission and reception section 108, or the image read section 109 in response to the job type.

If the job type is "print," the set information acquisition control section 104 sends the instruction to the print job generation section 106.

At this time, the print job generation section 106 generates a print job for processing target data (image information) stored in a work area (not shown) based on the instruction received from the set information acquisition control section 104 and sends a print request of the print job to the print processing section 107. The print processing section 107 performs print processing of the print job generated by the print job generation section 106 based on the instruction.

Next, if the job type identified by the job type identification section 103 is "transmission and reception," the set information acquisition control section 104 sends the instruction to the transmission and reception section 108.

At this time, the transmission and reception section 108 transmits and receives the processing target data (image information) stored in the work area (not shown) based on the received instruction.

Further, if the job type identified by the job type identification section 103 is "image read," the set information acquisition control section 104 sends the instruction to the image read section 109.

At this time, the image read section 109 reads the image data from the document based on the instruction.

If the job type identified by the job type identification section 103 is "facsimile transmission," the set information acquisition control section 104 determines whether or not the abbreviated number of the facsimile destination is specified in the instruction received from the job type identification section 103.

For example, if the instruction is in the XML format, etc., the set information acquisition control section 104 determines whether or not the abbreviated number of the facsimile destination is specified as attribute information of the <SpeedDial> tag.

If it is determined in the determination processing that the abbreviated number is not specified in the instruction, the set information acquisition control section 104 sends the instruction and the identified job type to the initialization information acquisition section 112. The initialization information acquisition section 112 acquires initialization information in facsimile transmission from the initialization information storage section 113 and sends the initialization information together with the received instruction to the facsimile transmission job generation section 111.

The facsimile transmission job generation section 111 generates a facsimile transmission job based on the acquired initialization information and executes facsimile transmission to the destination specified by the destination information described in the instruction.

If the set information acquisition control section 104 determines that the abbreviated number of the facsimile destination is specified in the <SpeedDial> tag in the XLM format, the set information acquisition control section 104 sends the instruction to the determination section 110. At this time, the determination section 110 determines whether or not the destination number described in the instruction is contained in the destination number of the transmission set information for the abbreviated number stored in the set information storage section 105 or determines whether or not the destination number of the transmission set information for the abbreviated number and the destination number described in the instruction are the same (match).

If the destination number described in the instruction is contained in the destination number of the transmission set information or the destination number described in the instruction and the destination number of the transmission set information are the same, the instruction is sent to the facsimile transmission job generation section 111.

The facsimile transmission job generation section 111 generates a facsimile transmission job (image information) based on the transmission set information and sends the generated facsimile transmission job and the instruction to the facsimile transmission section 114.

The facsimile transmission section 114 transmits the facsimile transmission job to the destination specified by the destination number based on the instruction.

An example of the transmission set information stored in the set information storage section 105 at this time is shown in FIG. 5.

The transmission set information shown in FIG. 5 is shown as a table structure and is made up of an [abbreviated number] item 501, a [job type] item 502, a [destination number] item 503, a [communication mode] item 504, a [modem speed] item 505, a [transmission level] item 506, an [incoming level] item 507, and a [number of redial times] item 508.

The [abbreviated number] item 501 is information indicating the abbreviated number. In facsimile transmission, the abbreviated number is specified, whereby facsimile transmission is executed to the destination specified by the destination number indicated in the [destination number] item 503 of the same record as the abbreviated number.

The [job type] item 502 indicates the job type and "facsimile transmission" is specified.

The [destination number] item 503 is the dial number of the facsimile destination and is information indicating the destination to which facsimile transmission is executed when the abbreviated number specified by the [abbreviated number] item 501 of the same record as the dial number.

The [communication mode] item 504 is the communication standard when communications are conducted through a communication line, the [modem speed] item 505 is information indicating the communication speed, the [transmission level] item 506 and the [incoming level] item 507 are communication sensitivity at the transmission time and at the incoming time, and the [number of redial times] item 508 is the number of times facsimile transmission is again executed when facsimile transmission cannot be completed due to an error.

In the example shown in FIG. 5, "0001" is set in the [abbreviated number] item 501, "facsimile transmission" is set in the [job type] item 502, and "03-1234-5678" is set in the [destination number] item 503 and thus the abbreviated number "0001" is specified, whereby facsimile transmission to the destination number "03-1234-5678" is executed.

"G3 auto" is set in the [communication mode] item 504, "14400 bps" is set in the [modem speed] item 505, "0 dB" is set in the [transmission level] item 506, "25 dB" is set in the [incoming level] item 507, and "five" is set in the [number of redial times] item 508. Thus, facsimile transmission is executed using the "G3" communication standard at the communication speed "14400 bps," the transmission level is set to "0 dB," the incoming level is set to "25 dB," and redial is executed up to "five times" if an error occurs.

Upon reception of the instruction in the XML format or the instruction of the table structure as shown in FIG. 4 in a state in which the transmission set information is stored in the set information storage section 105, the determination section 110 determines that the abbreviated number "0001" is shown in the transmission set information because the abbreviated number described in the instruction is "0001."

Further, the determination section 110 determines that the destination number "03-1234-5678" described in the instruction is described as the destination number corresponding to the abbreviated number "0001."

Thus, the determination section 110 sends the instruction to the facsimile transmission job generation section 111 and the facsimile transmission job generation section 111 executes facsimile transmission based on the instruction.

If it is determined that the abbreviated number of the facsimile destination is specified in the instruction, when the destination number described in the instruction is not contained in the destination number of the transmission set information or when the destination number described in the instruction and the destination number of the transmission set information are not the same, the instruction is sent to the initialization information acquisition section 112.

The initialization information acquisition section 112 acquires initialization information in facsimile transmission from the initialization information storage section 113 and sends the initialization information together with the received instruction to the facsimile transmission job generation section 111. Next, a display (not shown) displays that facsimile transmission has been executed to the destination specified by the destination number described in the instruction which is different from the destination number associated with the abbreviated number of the transmission set information.

Execution of facsimile transmission to the destination specified by the destination number different from the destination number associated with the abbreviated number of the transmission set information may be displayed before execution of facsimile transmission.

In addition, execution of facsimile transmission to the destination different from the destination number of the transmission set information associated with the abbreviated number may be recorded as transmission history information. Next, the destination number of the facsimile destination, and a confirmation request of the destination number described in the transmission set information stored in the set information storage section 105 may be displayed on the display after facsimile transmission or during facsimile transmission.

Electronic mail may be transmitted to a previously specified destination as a confirmation request. After the passage of a given time from recording transmission history information, the transmission history information may be referenced to display a confirmation request or to transmit electronic mail for the confirmation of the destination.

Subsequently, the facsimile transmission job generation section 111 generates a facsimile transmission job based on initialization information and sends the generated facsimile transmission job and the instruction to the facsimile transmission section 114. The facsimile transmission section 114 transmits the facsimile transmission job by facsimile based on the instruction.

If the destination number described in the instruction is not contained in the destination number of the transmission set information or if the destination number described in the instruction and the destination number of the transmission set information are not the same, a facsimile transmission job may be generated using at least a part of the transmission set information set for the abbreviated number described in the instruction and the generated facsimile transmission job may be transmitted.

At this time, at least a part of the transmission set information is information forming transmission set information that can be handled by the destination facsimile machine.

FIG. 6 is similar to the transmission set information shown in FIG. 5 and shows transmission set information after [destination number] item 503 of the record with [abbreviated number] item 501 being "0001" is changed from "03-1234-5678" to "06-6789-3210."

If the determination section 110 receives the instruction in the XML format in a state in which the transmission set information as shown in FIG. 6 is stored in the set information storage section 105, the determination section 110 determines that the destination number "03-1234-5678" described in the instruction is not contained in and is not the same as the destination number "06-6789-3210" corresponding to the abbreviated number "0001."

At this time, the determination section 110 sends the instruction to the initialization information acquisition section 112 and the initialization information acquisition section 112 acquires initialization information in facsimile transmission from the initialization information storage section 113 and sends the initialization information to the facsimile transmission job generation section 111 together with the received instruction.

Figure 2:
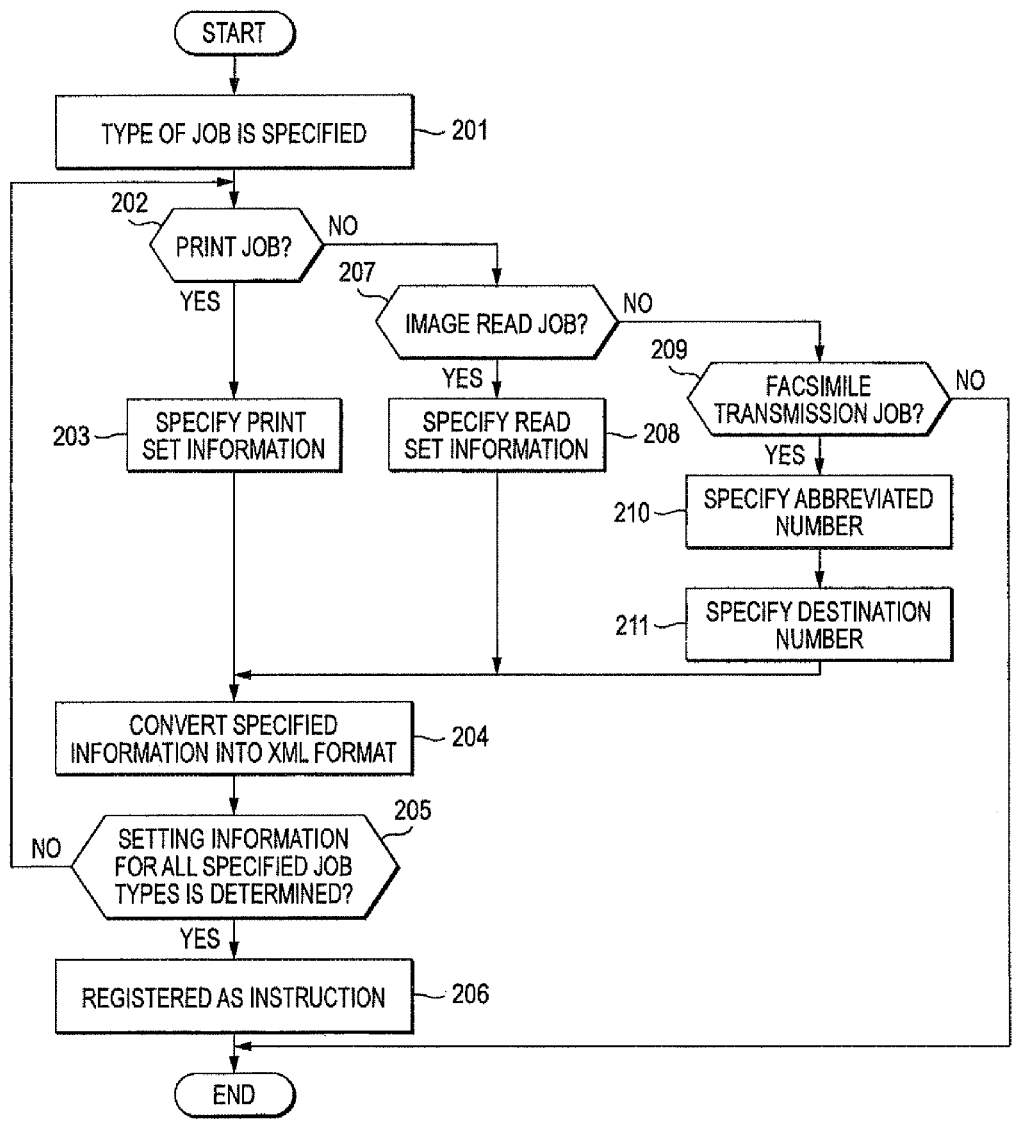
FIG. 2 is a flowchart to show a flow of processing until an instruction retained in an instruction retention section 102 shown in FIG. 1 is registered.

FIG. 2 is a flowchart to show a flow of processing until the instruction retained in the instruction retention section 102 shown in FIG. 1 is registered.

In FIG. 2, first the type of job specified in the instruction is specified (201). Subsequently, whether or not the specified job type is a print job is determined (202). If it is determined that the job type is a print job (YES at 202), print set information used at the print output time of the print job is specified (203).

Subsequently, it is determined that the job type is not a print job (NO at 202), whether or not the job type is an image read job is determined (207). If it is determined that the job type is an image read job (YES at 207), read set information is specified (208).

If it is determined that the job type is not an image read job (NO at 207), subsequently whether or not the job type is a facsimile transmission job is determined (209). If the job type is not a facsimile transmission job (NO at 209), the processing is terminated. If it is determined that the job type is a facsimile transmission job (YES at 209), the abbreviated number and the destination number of the facsimile destination are specified (210 and 211).

Subsequently, specified instruction information is converted into the XML format (204).

Whether or not instruction information is set for all specified job types is determined (205). If instruction information is set for all job types (YES at 205), an instruction in the XML format is registered in the instruction retention section 102.

If instruction information is not set for all specified job types (NO at 205), step 202 and the later steps are again executed.

The processing of the flowchart shown in FIG. 2 is performed using the user interface in the image forming apparatus and in addition, may be performed by a client PC (containing a mobile terminal, etc.,) connected to the image forming apparatus through a communication line.

Figure 3:
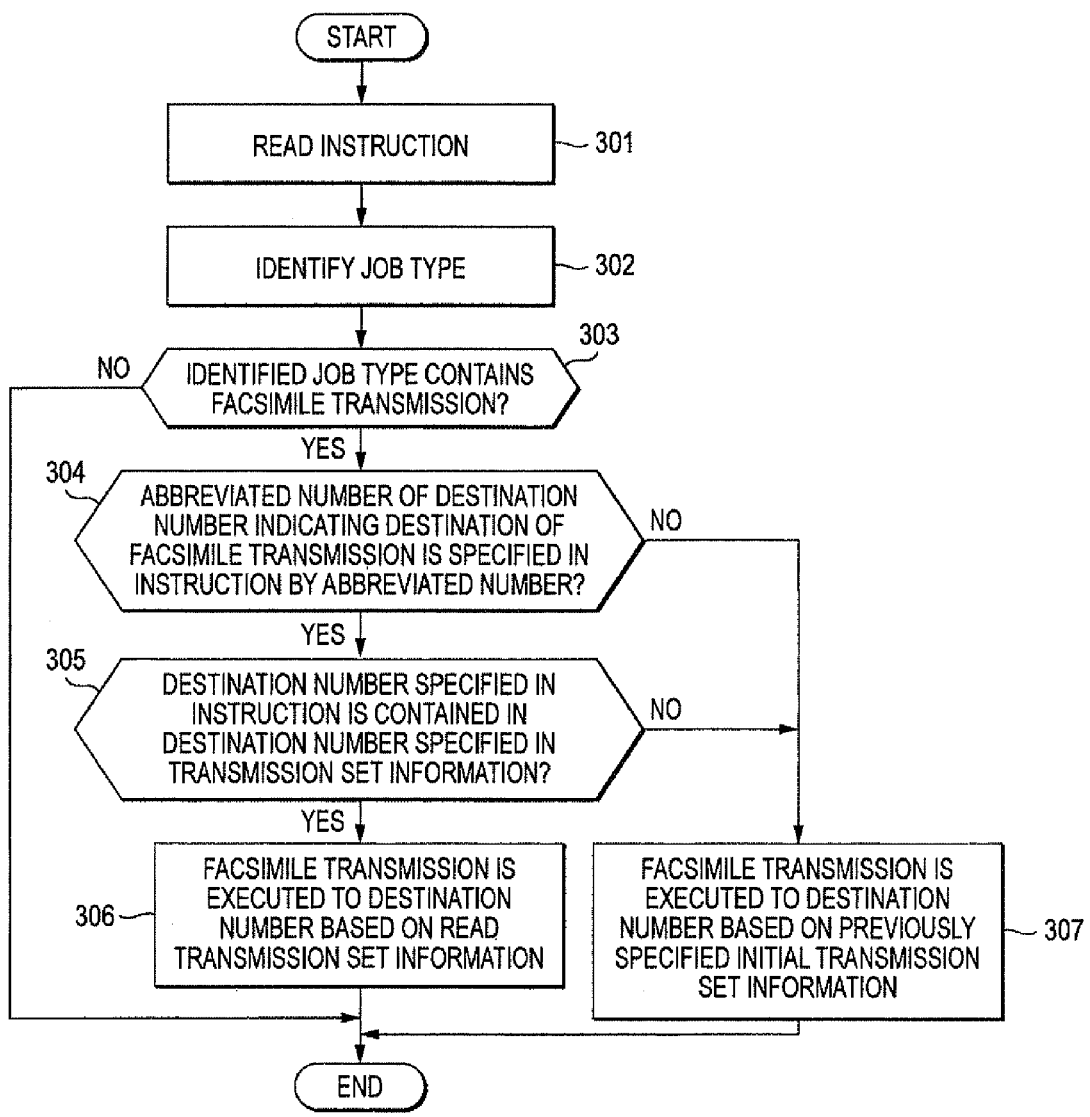
FIG. 3 is a flowchart to show a flow of facsimile transmission processing in the image forming apparatus in the embodiment of the invention.

FIG. 3 is a flowchart to show a flow of facsimile transmission processing performed in the image forming apparatus in the embodiment of the invention.

In FIG. 3, the image forming apparatus reads the instruction retained in the instruction retention section 102 (301) and identifies the job type described in the instruction (302). For example, for the instruction in the XML format (instruction in FIG. 4), the job type is identified as "image read" and "facsimile transmission."

Subsequently, whether or not the identified job type contains facsimile transmission is determined (303). If facsimile transmission is identified as the job type as in the instruction in the XML format (YES at 303), subsequently whether or not the abbreviated number of the destination number indicating the destination of facsimile transmission is specified in the instruction is determined (304).

If facsimile transmission is not specified (NO at 303), the processing is different from the processing of the flowchart and thus is terminated.

If it is determined that the abbreviated number of the destination number indicating the destination of facsimile transmission is specified in the instruction (YES at 304), further whether or not the destination number specified in the instruction is contained in the destination number specified in the transmission set information is determined (305).

If it is determined that the destination number specified in the instruction is contained in the destination number specified in the transmission set information (YES at 305), facsimile transmission is executed to the destination number specified in the instruction based on the transmission set information for the destination number (306).

If it is determined that the abbreviated number is not specified in the instruction (NO at 304) or when it is determined that the destination number specified in the instruction is not contained in the destination number in the transmission set information or that the same destination number does not exist (NO at 305) although the abbreviated number is specified in the instruction, facsimile transmission is executed to the destination number specified in the instruction based on the previously specified initial transmission set information (307).

At this time, execution of facsimile transmission to the destination number different from the destination number associated with the abbreviated number, the destination number described in the instruction is displayed on the display of the image forming apparatus or the display of the client PC connected to the image forming apparatus.

When it is determined that the destination number specified in the instruction is not contained in the destination number in the transmission set information or that the same destination number does not exist although the abbreviated number is specified in the instruction, for example, the case where after an instruction is created referencing the abbreviated number, the destination number (dial number) of the instruction is changed, the case where after an instruction is created referencing the abbreviated number, the abbreviated destination number is changed, the case where the abbreviated number is deleted, the case where an instruction is taken out from one device using an external application, etc., and is set in a different device, etc., applies.

It is to be understood that the exemplary embodiment shown above is one exemplary embodiment of the invention and the invention is not limited to the exemplary embodiment and various modifications and changes may be made without departing from the spirit and the scope of the invention.

In the invention, from a record medium (CD-ROM, DVD-ROM, etc.,) storing a program for implementing the means described above, the program is installed in a computer and is executed, whereby an image forming apparatus for executing the processing described above may be configured. A CPU (Central Processing Unit), ROM (Read-Only Memory), RAM (Random Access Memory), and a hard disk are connected to the image forming apparatus through a system bus. The CPU performs processing using the RAM as a work area in accordance with the program stored in the ROM or the hard disk.

A medium for supplying the program may be a communication medium (a medium for retaining the program temporarily or fluently like a communication line or a communication system).

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image information transmission device comprising:
a registration unit that registers an image information transmission instruction describing a first destination number specifying a destination of image information and an abbreviated number corresponding to the first destination number;
a storage unit that stores a second destination number and transmission setting information used for transmitting the image information to the destination specified by the second destination number so that the second destination number and the transmission setting information are associated with the abbreviated number;
a determination unit that determines whether or not the first destination number described in the image information transmission instruction is the same as the second destination number stored in association with the abbreviated number in the storage unit when the image information is transmitted based on the image information transmission instruction registered through the registration unit; and
an image information transmission unit that transmits the image information by using the transmission setting information with respect to the abbreviated number stored in the storage unit to the destination specified by the first destination number described in the image information transmission instruction when the determination unit determines that the first destination number is the same as the second destination number stored in the storage unit, wherein
the image information transmission unit transmits the image information to the destination specified by the first destination number described in the image information transmission instruction when the determination unit does not determine that the first destination number is the same as the second destination number stored in the storage unit.

2. The image information transmission device according to claim 1, wherein the image information transmission unit transmits the image information to the destination by using at least a part of the transmission setting information stored corresponding to the abbreviated number of the first destination number described in the image information transmission instruction.

3. The image information transmission device according to claim 1 further comprising display unit that display that the transmission unit transmits the image information to the destination specified by the first destination number different from the second destination number associated with the abbreviated number stored in the storage unit.

4. The image information transmission device according to claim 2 further comprising display unit that display that the transmission unit transmits the image information to the destination specified by the first destination number different from the second destination number associated with the abbreviated number stored in the storage unit.

5. The image information transmission device according to claim 1 comprising:
   a recording unit that records transmission history information indicating transmitting of the image information to the destination specified by the first destination number described in the image information transmission instruction when the first destination number described in the image information transmission instruction differs from the second destination number associated with the abbreviated number described in the image information transmission instruction stored in the storage unit; and
   a confirmation request unit that makes a confirmation request as to the fact that the first destination number of the destination of the image information according to the transmission history information recorded by the recording unit is different from the second destination number associated with the abbreviated number described in the image information transmission instruction stored in the storage unit.

6. The image information transmission device according to claim 2 comprising:
   a recording unit that records transmission history information indicating transmitting of the image information to the destination specified by the first destination number described in the image information transmission instruction when the first destination number described in the image information transmission instruction differs from the second destination number associated with the abbreviated number described in the image information transmission instruction stored in the storage unit; and
   a confirmation request unit that makes a confirmation request as to the fact that the first destination number of the destination of the image information according to the transmission history information recorded by the recording unit is different from the second destination number associated with the abbreviated number described in the image information transmission instruction stored in the storage unit.

7. An image information transmission method comprising:
   registering an image information transmission instruction describing a first destination number specifying a destination of image information and an abbreviated number corresponding to the first destination number;
   storing a second destination number and transmission setting information used for transmitting the image information to the destination specified by the second destination number so that the second destination number and the transmission setting information is associated with the abbreviated number;
   determining, using a determination unit, whether or not the first destination number described in the image information transmission instruction is contained in the second destination number stored in association with the abbreviated number when the image information is transmitted based on the image information transmission instruction registered through the registration step; and
   transmitting the image information by using the transmission setting information with respect to the abbreviated number stored by the storing step to the destination specified by the first destination number described in the image information transmission instruction when the determination unit determines that the first destination number is contained in the second destination number stored by the storing step, wherein
      at least one of the preceding steps is performed by an image information transmission device, and
      an image information transmission unit transmits the image information to the destination specified by the first destination number described in the image information transmission instruction when the determination unit does not determine that the first destination number is the same as the second destination number stored in the storing step.

8. A non-transitory computer readable storage medium storing a program causing a computer to execute a process for image information transmission, the process comprising:
   registering an image information transmission instruction describing a first destination number specifying a destination of image information and an abbreviated number corresponding to the first destination number;
   storing a second destination number and transmission setting information used for transmitting the image information to the destination specified by the second destination number so that the second destination number and the transmission setting information is associated with the abbreviated number;
   determining, using a determination unit, whether or not the first destination number described in the image information transmission instruction is contained in the second destination number stored in association with the abbreviated number when the image information is transmitted based on the image information transmission instruction registered through the registration step; and
   transmitting the image information by using the transmission setting information with respect to the abbreviated number stored by the storing step to the destination specified by the first destination number described in the image information transmission instruction when the determination unit determines that the first destination number is contained in the second destination number stored by the storing step, wherein
      an image information transmission unit transmits the image information to the destination specified by the first destination number described in the image information transmission instruction when the determination unit does not determine that the first destination number is the same as the second destination number stored in the storing step.

* * * * *